United States Patent [19]
Chiulli et al.

[11] Patent Number: 5,652,612
[45] Date of Patent: Jul. 29, 1997

[54] APPARATUS AND METHOD FOR ENHANCING PRINTING EFFICIENCY TO REDUCE ARTIFACTS

[75] Inventors: Carl A. Chiulli, Randolph; Yalan Mao, Lexington; William T. Plummer, Concord, all of Mass.

[73] Assignee: Polaroid Corporation, Cambridge, Mass.

[21] Appl. No.: 599,871

[22] Filed: Feb. 12, 1996

Related U.S. Application Data

[63] Continuation of Ser. No. 238,359, May 5, 1994, abandoned.
[51] Int. Cl.$^6$ .............................. B41J 2/47; G01D 15/34; G02B 26/00; G02B 27/00
[52] U.S. Cl. ............................................. 347/256; 347/260
[58] Field of Search ..................... 372/27, 43; 347/233, 347/241, 256; 359/196–226, 301, 212, 213, 214, 290

[56] References Cited

U.S. PATENT DOCUMENTS

| | | | |
|---|---|---|---|
| 5,210,548 | 5/1993 | Grabowski | 347/241 |
| 5,235,183 | 8/1993 | Whiting et al. | 250/236 |

FOREIGN PATENT DOCUMENTS

| | | |
|---|---|---|
| A 59-040766 | 3/1984 | Japan. |
| A 60-195568 | 10/1985 | Japan. |

OTHER PUBLICATIONS

IBM Technical Disclosure Bulletin, vol. 25, No. 5, Oct. 1982, New York, p. 2460, W.I. Imaino "Double frequence scanner/printer".

*Primary Examiner*—Benjamin R. Fuller
*Assistant Examiner*—Raquel Yvette Gordon
*Attorney, Agent, or Firm*—Robert A. Sabourin

[57] ABSTRACT

Apparatus and methods for exposing multilayered thermal imaging by proper optimization of the exposing radiation angle of incidence of a coherent radiation source to eliminate "cloud" or "woodgrain" artifacts stemming from local differences in printing efficiency across a sheet of the multilayered imaging media. A media is mounted to an exposure surface and exposed with a scanning coherent Gaussian laser beam at an angle other than normal incidence. The angle of incidence of the exposing beam is intentionally made large enough so that all rays with high reflectance loss are paired with equally many with low reflectance loss to increase printing efficiency. This efficiency occurs over a range of angles between 21 and 25 degrees, with some benefit beginning at 16 degrees.

6 Claims, 16 Drawing Sheets

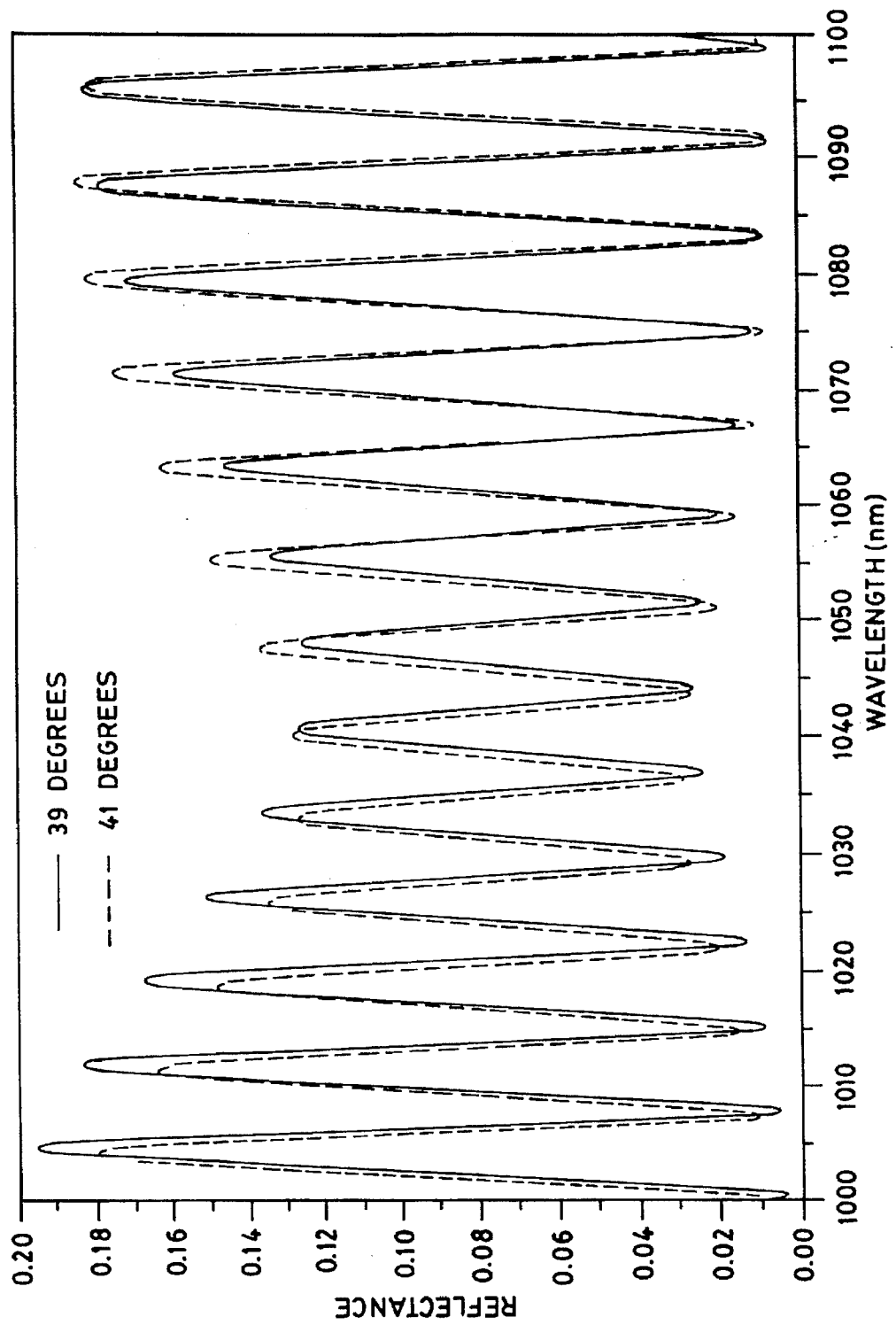

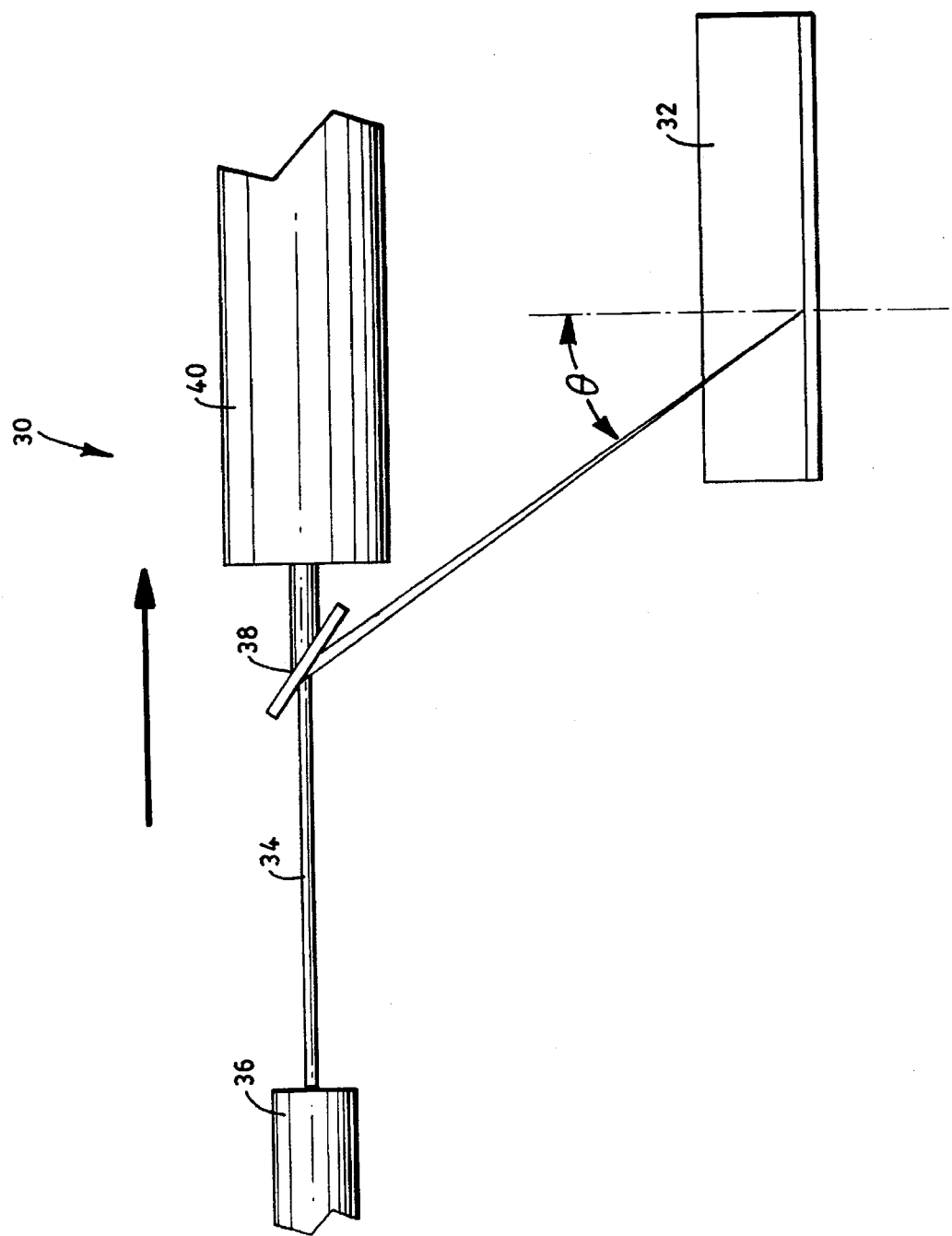

APPARATUS AND METHOD FOR ENHANCING PRINTING EFFICIENCY TO REDUCE ARTIFACTS

This application is a continuation of application Ser. No. 08/238,359 filed May 5, 1994, now abandoned.

BACKGROUND OF THE INVENTION

1. Field of the Invention

This invention in general relates to methods and apparatus for exposing multilayered imaging media and in particular methods and apparatus for exposing multilayered thermal media without introducing visual artifacts.

2. Description of the Prior Art

Exposure of multilayered thermal media by coherent laser sources sometimes results in a "wood-grain" or "cloud" pattern in areas that are supposed to be featureless. The pattern is recognizable as an optical interference phenomenon related to contours of equal thickness of a transparent cover sheet, through which a buried image forming layer material is exposed. A variety of methods have been proposed for eliminating the pattern, including anti-reflection coatings or internal layers, a roughened surface or internal layer, multiple-wavelength lasers, less coherent lasers, non-Gaussian light distribution, and so on.

The phenomenon is believed to be principally a result of variation in back-reflection of the incoming laser beam as a result of local variations in thickness of a relatively thick (40–50 micrometers or so) exposure-side cover sheet, or of one or more of the layers below it, which receive the radiation. The total back-reflection is a squared sum of a number of interface reflections of various strengths; the number of interfaces depending, of course, on the particular structure of the layered media. Variations in amount occur as a result of local phase variations' impacting the sum of the contributions.

One known approach to reducing image artifacts when exposing multilayered media with a coherent laser in a particular printer architecture is described in U.S. Pat. No. 5,210,548 entitled "METHOD AND SYSTEM FOR REDUCING SURFACE REFLECTIONS FROM A PHOTOSENSITIVE IMAGING MEMBER" issued on May 11, 1993 in the name of Edward E. Grabowski. Here, the laser is used in a flat bed scanner with the incident angle of the exposing beam selected so that it is at the Brewster's angle for light polarized in a plane parallel to the plane of the media. With this arrangement, there is little reflection and therefore substantial absorption for exposing radiation polarized in the proper azimuth. As such, there is little variation in exposure levels as a result of variations in the outermost surface of the media. However, this solution is only appropriate for printing architecture and laser combinations that can maintain a particular state of polarization throughout the optical train to the media.

Consequently, it is a primary object of this invention to provide apparatus and methods by which multilayered imaging media may be exposed with coherent light sources without introducing visual artifacts.

It is another object of the present invention to provide apparatus and methods by which multilayered imaging media located on the inside of a rotating drum may be exposed by a coherent source without introducing visual artifacts.

Other objects of the invention will in part be obvious and in part appear hereinafter when the following detailed description is read in connection with the accompanying drawings.

SUMMARY OF THE INVENTION

The cause of the "wood grain" or "cloud" problem has been identified as stemming from local differences in printing efficiency across a sheet of multilayered imaging media of the type that is exposed by thermal imaging with a coherent laser. The film structures of interest have multiple dielectric layers of different index, and it has been found that the local reflectance of a light ray is a function of wavelength, media thickness, and angle of incidence. And, it has been discovered that the observed patterns of defect are consistent with changing printing efficiency which is dependent upon local thickness differences that cause local variation in reflection loss. For thick dielectric layers the change needed to add another half wavelength is a small percentage change, and so would be difficult to prevent. Instead of attempting to control surface thickness variations to extremely tight tolerances, it has been discovered that it is more sensible to attempt to "average" out any exposure errors by proper selection of the exposing radiation angle of incidence. This is done at any locale on the media by insisting on a large range of angles of incidence for the exposing beam; large enough so that all the rays with high reflectance loss may be paired with an equal number of rays with low reflectance loss.

At perpendicular incidence the reflection changes only slowly with angle, since it depends upon the cosine of the ray angle in the material, so a very large beam angle (numerical aperture) would be needed to include enough rays, different in reflection properties from those at the axis, to bring about the cancellation. (Such a beam would not have an adequate depth of focus in an internal drum printer, although in other architectures it may be used). But if the exposing beam is inclined to the media surface ~20°, the reflectance changes faster with angle, and a full set of rays is achievable with all possible reflectances within a reasonable numerical aperture. When this is done, it has been observed that exposure is immune to local changes in thickness because such a change will increase the reflectance for some rays but decrease it for others, leaving the sum unchanged anywhere in the exposed spot.

Applying the foregoing analysis, it has been found that optimal benefit is obtained by arranging the angle of incidence of an exposing coherent beam in a scanning rotating drum system, to be within the range between 21 and 25 degrees, with some benefit beginning from approximately 16 degrees.

DESCRIPTION OF THE DRAWINGS

The novel features that are considered characteristic of the present invention are set forth with particularity herein. The organization and method of operation of the invention, together with other objects and advantages thereof, will best be understood from the following description of the illustrated embodiments when read in connection with the accompanying drawings wherein:

FIGS. 5a–5g are graphs showing the sum of the reflectances versus wavelength for all of the surfaces for a given thickness of a multilayered medium for pairs of angles 2 degrees apart to approximate a Gaussian laser beam;

FIG. 11 is a diagrammatic elevational view of the apparatus of FIG. 10.

INTRODUCTION

Figure 1:
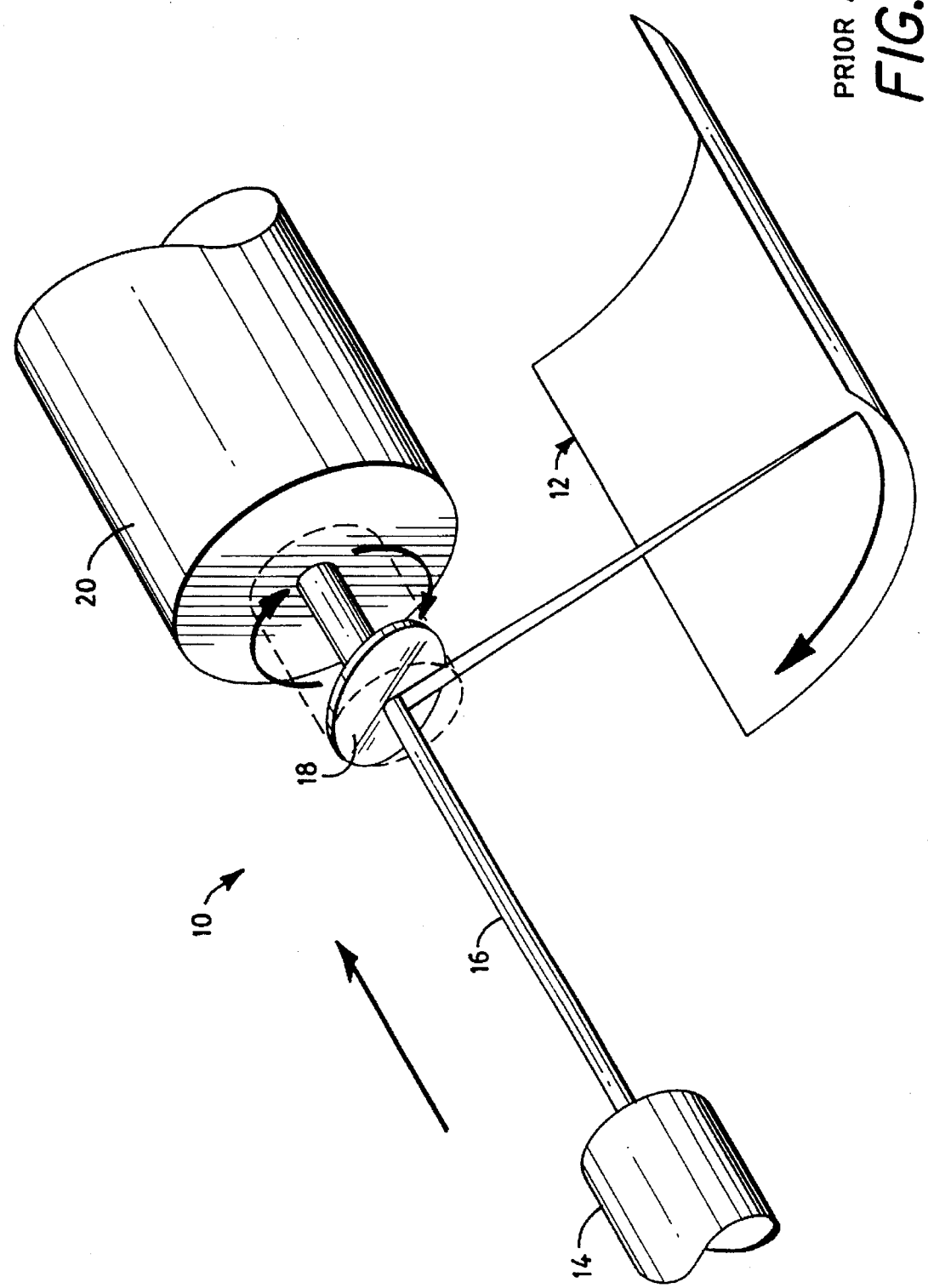
FIG. 1 is a diagrammatic perspective of a prior art apparatus for exposing multilayered image media by scanning it with a focused laser beam at normal incidence.

Reference is now made to FIG. 1 which diagrammatically shows a prior art apparatus 10 for exposing a multilayered medium 12 mounted on a fixed curved surface. Apparatus 10 comprises an optical head 14 that emits a laser beam that is modulated in a well-known manner in accordance with image data. Laser beam 16 is deflected through a right angle via mirror 18 that is rotated and translated via carriage 20. In this manner, medium 12 is exposed at normal incidence by scanning line-by-line as carriage 20 is moved and rotated relative to medium 12.

Figure 2:
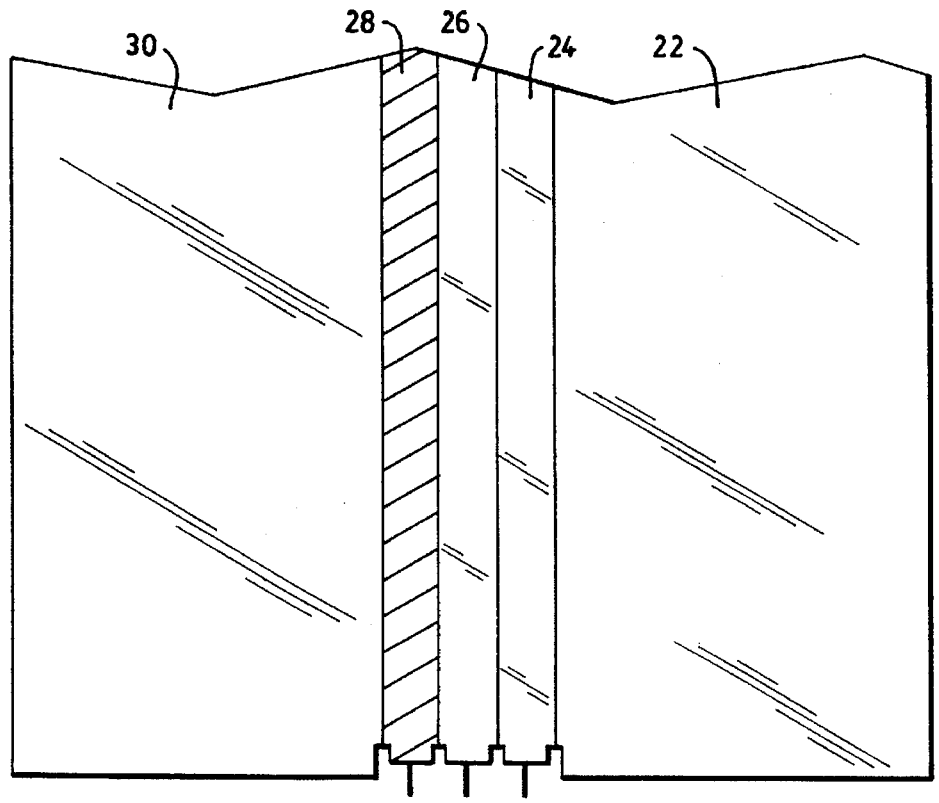
FIG. 2 is an enlarged, diagrammatic side elevational view of a multilayered imaging medium of the type that is suitable for use with the apparatus and methods of the invention.

FIG. 2 shows medium 12 to be a multilayered, peel-apart, structure comprising a first transparent top sheet 22 that is approximately 44 micrometers thick and has a refractive index of 1.66. Exposure of medium 12 is through transparent top sheet 22.

Underneath top sheet 22 is a compression layer 24 that is followed by an SAN layer 26 after which is a layer of carbon black 28. Carbon black layer 28 serves in the formation of the final image.

After carbon black layer 28 is a keeper layer 30 that is approximately 96 micrometers thick. Compression layer 24 is 2.4 micrometers thick with an index of refraction of 1.497; SAN layer 26 is 1.3 micrometers thick with an index of refraction of 1.557; and carbon layer 28 is 1.0 micrometers thick with an index of refraction of 1.60. Thin adhesion layers are part of the medium structure but are not shown and are thinner than the illustrated layers.

The medium structure is arranged such that carbon layer 28 will adhere to keeper sheet 30 if there is no exposure. When the keeper sheet and top sheet 22 are peeled apart, all of the carbon layer adheres to keeper sheet 30. With exposure, a change in the differential adhesion between carbon layer 28 and keeper layer 30 is selectively effected in image areas in accordance with imagewise information so that an image and its negative are formed when keeper 30 and top sheet 22 are peeled from one another. The final image retained on keeper layer 30 or top sheet 22 can be arranged to be either a positive or negative image as desired.

Figure 3:
FIG. 3 is a photograph of the "cloud" or "woodgrain" artifact that can result from exposing a multilayered imaging medium in a prior art device such as that illustrated in FIG. 1.
Figure 5A:
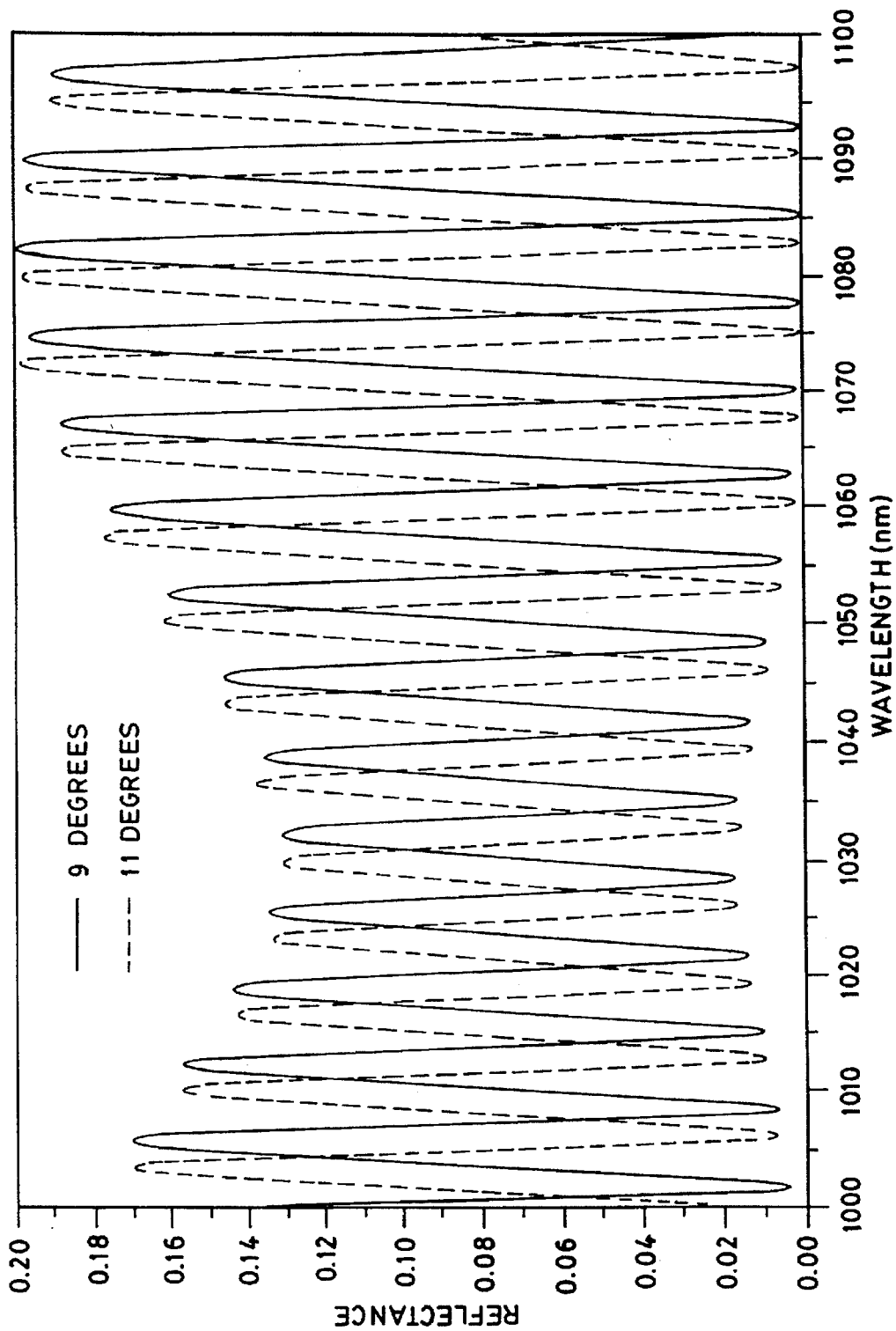
Figure 5B:
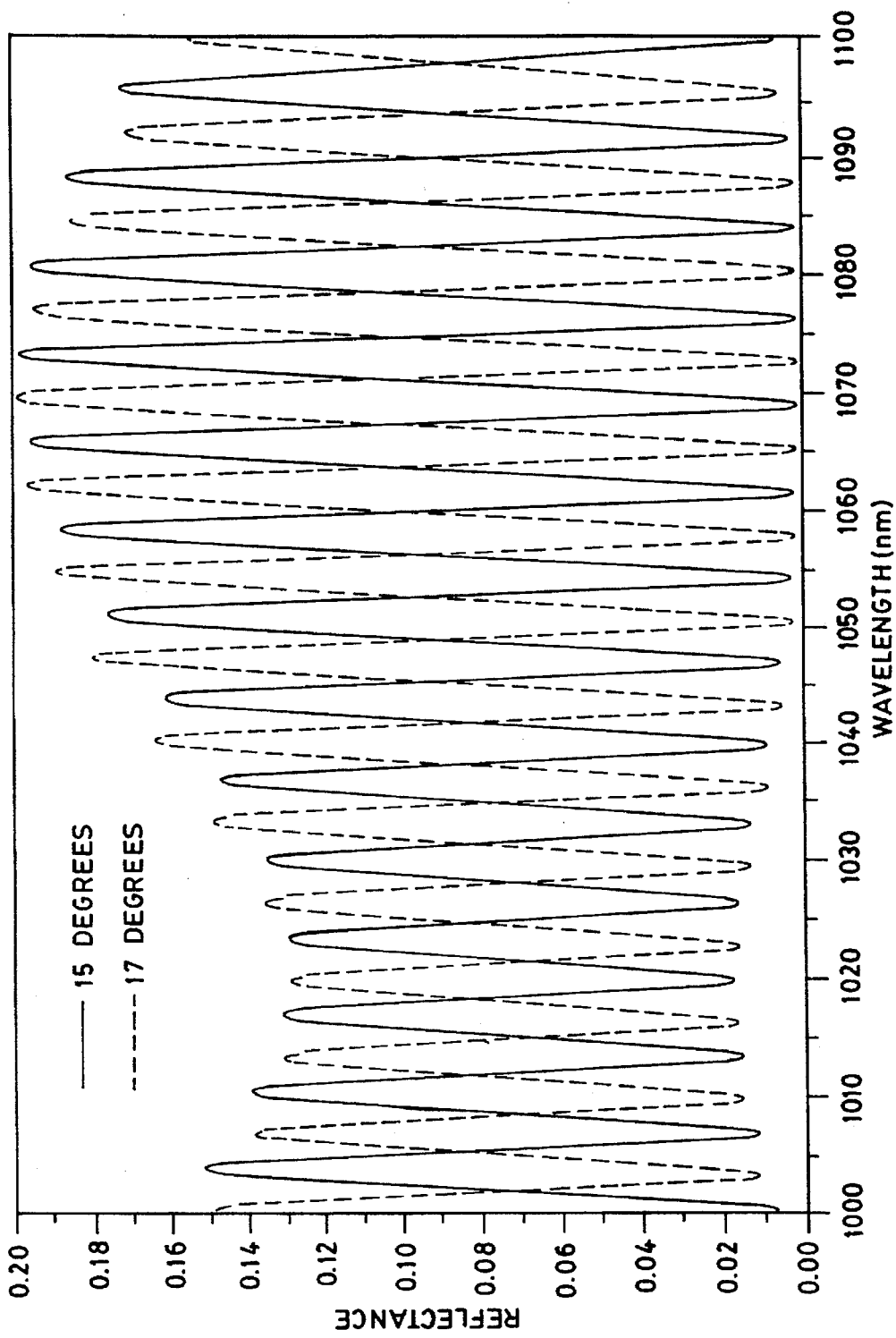
Figure 5C:
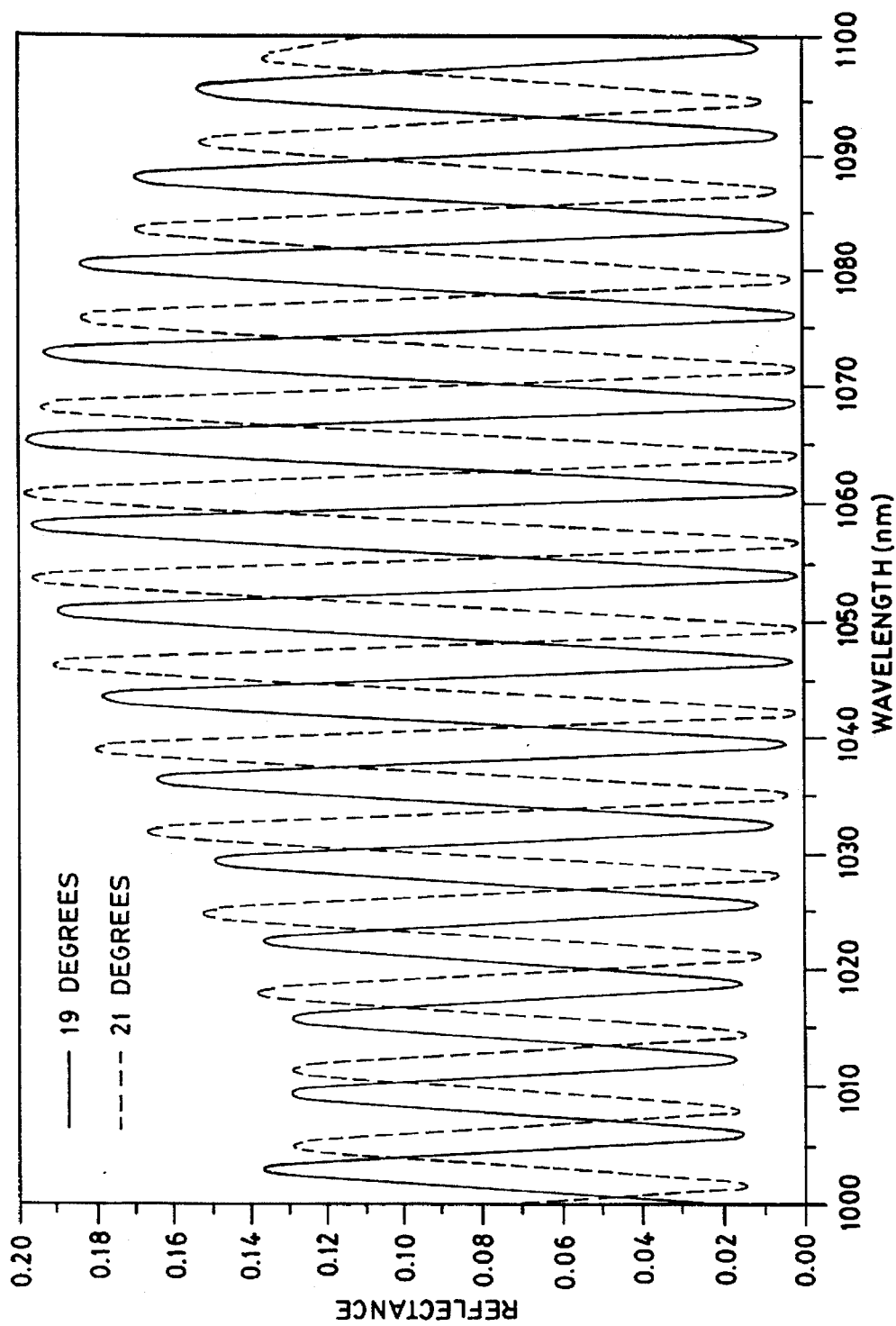
Figure 5D:
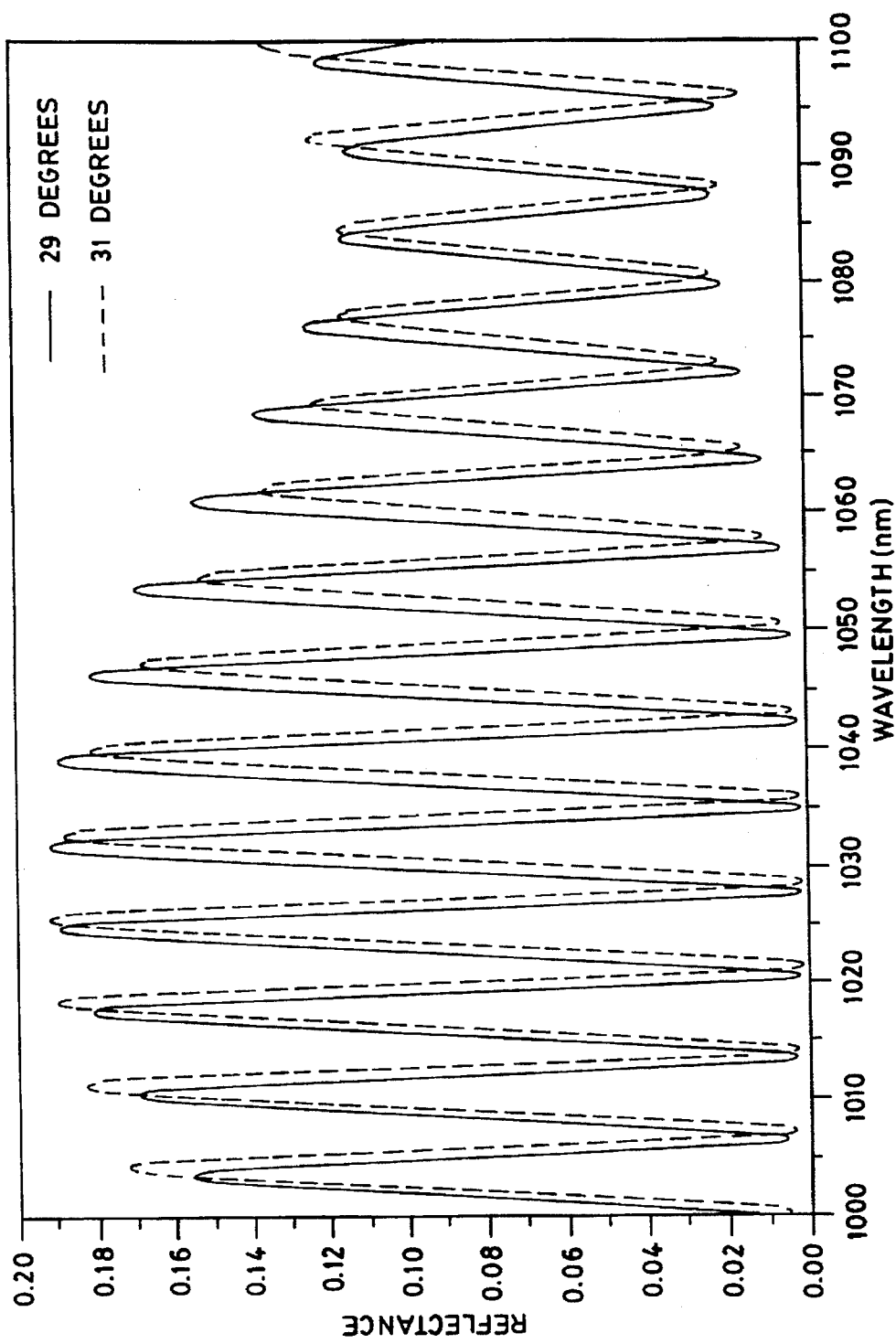
Figure 5F:
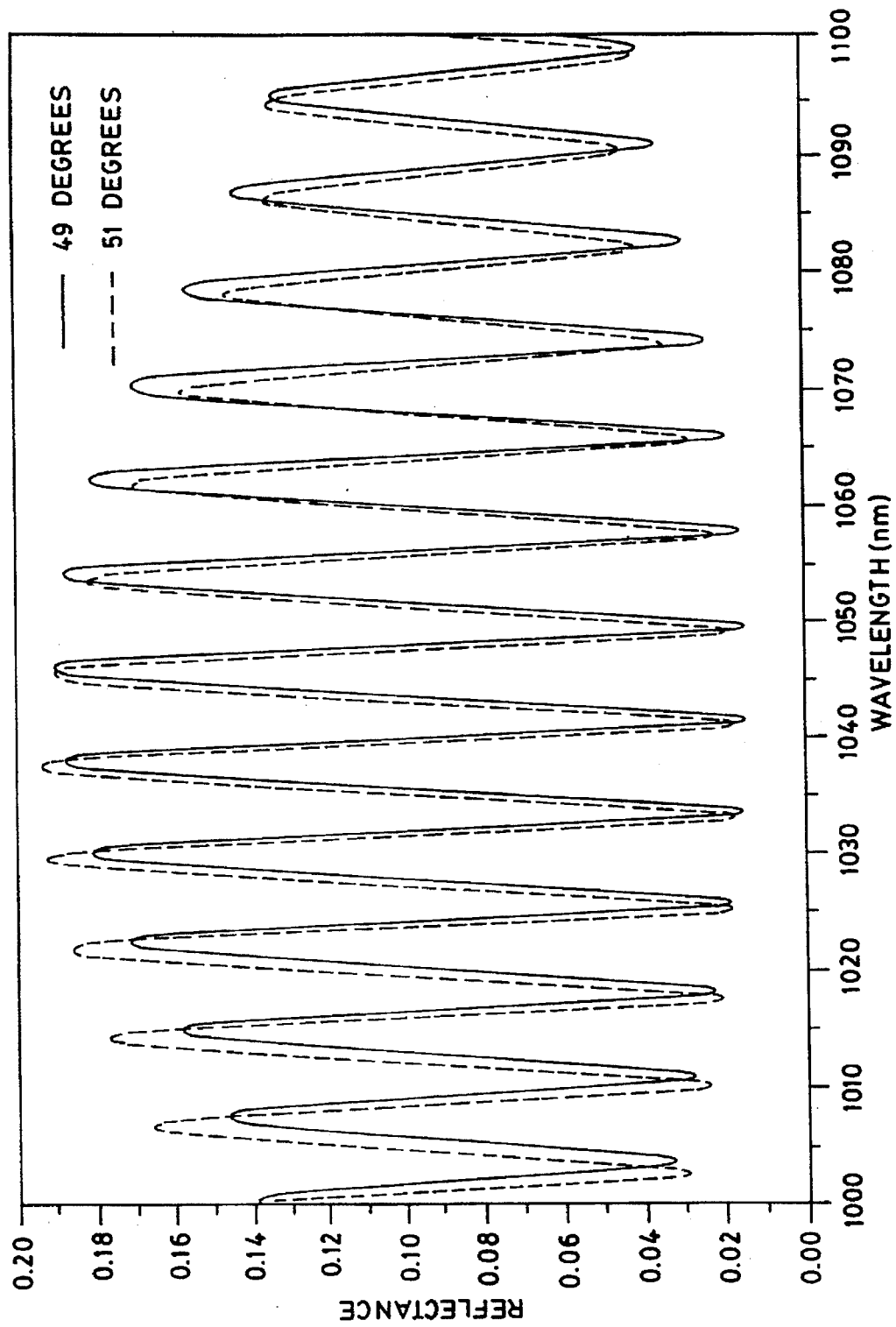
Figure 5G:
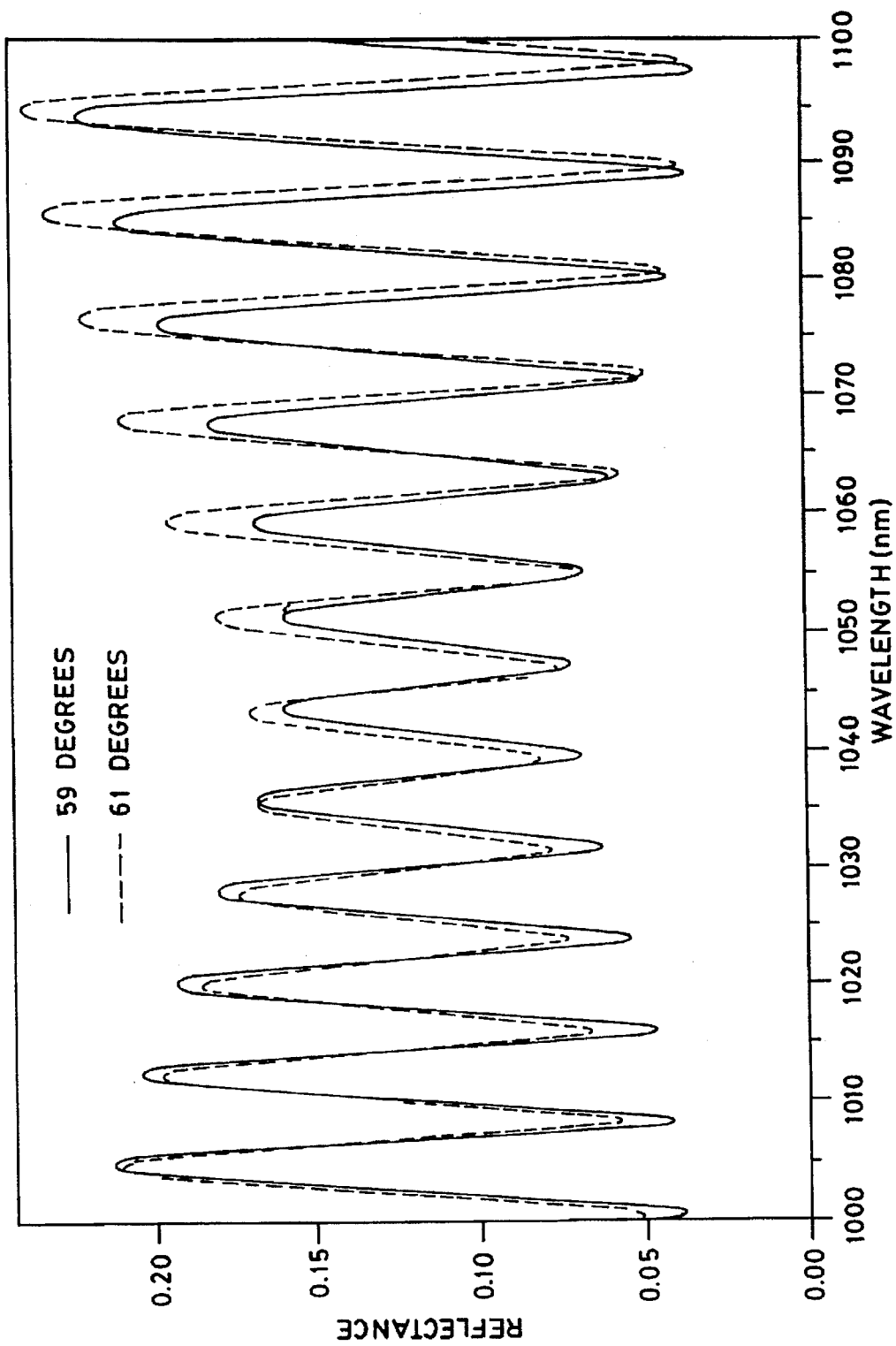

In exposing medium 12 at normal incidence, a "cloud" or "woodgrain" artifact can occur as the result of interference interactions between the exposing beam and the various layers comprising medium 12. An example of this type of artifact is shown in FIG. 3, and it is obviously unacceptable, particularly where important information may be encoded in tonal variations corresponding to the image. The present invention reduces or ameliorates such artifacts in the manner to be described.

DESCRIPTION OF THE PREFERRED EMBODIMENT

The solution of the present invention to the foregoing problem is based on the observation that there is an angular dependence of the relative phase of the four or more reflective contributions that may occur at each layer of medium 12. Each participating layer, including the 44 micrometer top sheet 22, has an effective optical thickness that scales with the cosine of the angle by which radiation passes through the layer. Near normal incidence the change of phases, thence net power reflectance, is minimal. As the angle of incidence increases, the reflectance changes faster with angle, and with larger angles oscillates rapidly between approximately 1% and 11%. The invention here was the discovery that there existed a suitable angle of incidence upon the sheet, dependent upon the numerical aperture of the printing radiation so that, on the average, the portion of the laser beam, divided by aperture angle, that is closer to the material shows a reflective property opposite to that of the portion of the beam that is further from the material. Thus, as one half is increasing reflectance with angle, the other half is decreasing reflectance, so that the total reflectance of the beam is nearly independent of angle there. When this condition is met, the impact of local variation of layer thicknesses upon reflectance is also reversed for the two portions of the beam, and the undesired artifact pattern vanishes. To understand the rationale for proper exposure angle for making artifact free images, reference is now made to FIG. 2.

The multiple-surface structure of medium 12 (FIG. 2) gives a reflectance for monochromatic light that varies rapidly with either wavelength or local thickness of the 44 micrometer transparent top sheet 22 because of alternating constructive and destructive interference of light when the reflections from the many interfaces are summed. The "cloud" pattern seen is a topographic mapping of physical thickness variations in the transparent top sheet 22 through which exposure is made. The interval between repetitive high or low exposure features, usually called "fringes", is a thickness change $\Delta T = \lambda/(2n)$, where $\lambda = 1.05$ microns and $n \approx 1.6$, so $\Delta T \approx 0.33$ micron or 13 millionths of an inch. Removal of the problem by sheet thickness control consequently would require a tolerance of ±0.1 micron over large areas.

Since light lost by reflection does not contribute to exposure, a reflection variance from 1% to 15% corresponds to an exposure variance from 99% to 85%, enough to cause a significant spot diameter variance at the printing threshold on a Gaussian spot.

Transparent top sheet 22 is thick enough so that the interference between reflections from the bottom and top surfaces can also be changed in relative phase by a change in angle of incidence. This effect depends upon the cosine of the light path angle within the sheet, so changes are slow near perpendicular incidence and generally increase with angle.

To estimate the dependence upon angle the exposure system was considered to be a Gaussian beam at the exit pupil, falling to $1/e^2$ of its central strength at an f/11 diameter. To simplify calculations, the laser beam may be treated as a pair of very small beams (high f/#) spaced apart in angle; the physics is accurate and even the resulting numbers will be very close. (An exact calculation is not much more difficult, but will not contribute to better understanding. It would show, however, that the methods described here are not at risk from minor changes in sheet thickness to the degree that the two-beam calculations would suggest.)

Figure 4:
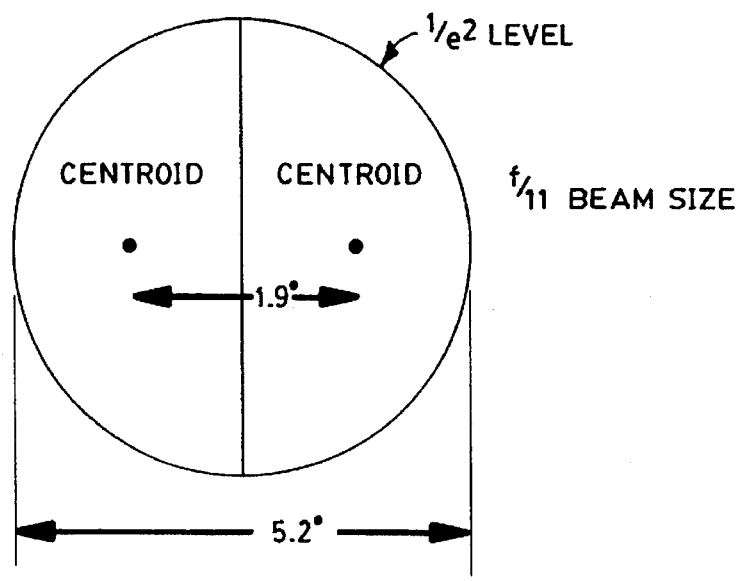
FIG. 4 is a diagrammatic plan view showing the centroids of both halves of the illumination distribution pattern from a Gaussian laser beam at f/11 at its $1/e^2$ limit and is useful in understanding certain principles of the invention.

To select a two-beam separation to represent the f/11 Gaussian, integration is made over a half-aperture pattern to find the center of gravity, or centroid. For a non-truncated beam the centroid of each half is found at $1/\sqrt{\pi} = 0.5642$ of the radius of the $1/e^2$ level. For the beam truncated by the optics at that level the distance to the centroid is only 0.365 of the edge radius from the center. Thus for an f11 beam, a half-diameter of the optical aperture calculates as 0.5×arctan (1/11)=2.6°. To replace each half of the beam with an infinitesimal beam at its centroid, each is spaced 0.365×2.6 from the optical center, or 1.9° from each other as in FIG. 4.

The reflectance of all surfaces summed is easy to compute for any wavelength, thickness, and angle. The results were calculated and are collected here for one thickness (the nominal) and are graphs of reflectance vs. wavelength for pairs of angles 2° apart approximating the beam (FIGS. 5a–g). The pairs straddle incidence angles of 10°, 16°, 20°, 30°, 40°, 50°, and 60°. If one plots the apparent phase offset between the angular pairs as a function of beam center angle, a smooth graph (FIG. 6) is obtained that can be read to give a predicted 180° phase difference at 16° beam center angle. Reflectances computed at 15° and 17°, included in FIG. 5b, confirm that number.

Figure 6:
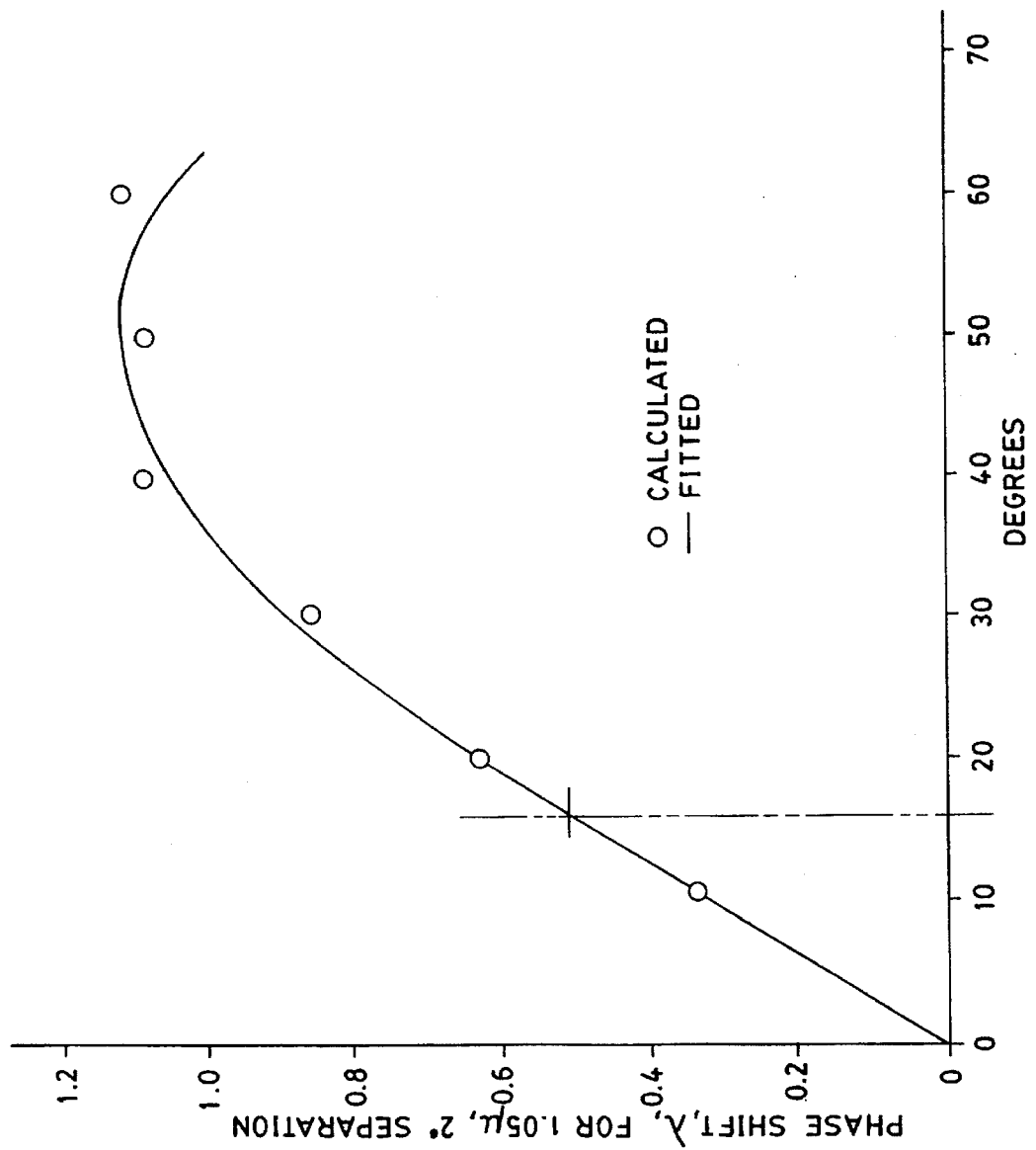
FIG. 6 is a graph which plots the apparent phase shift between the angular pairs of FIGS. 5a–5g as a function of beam center angle of exposure.
Figure 7:
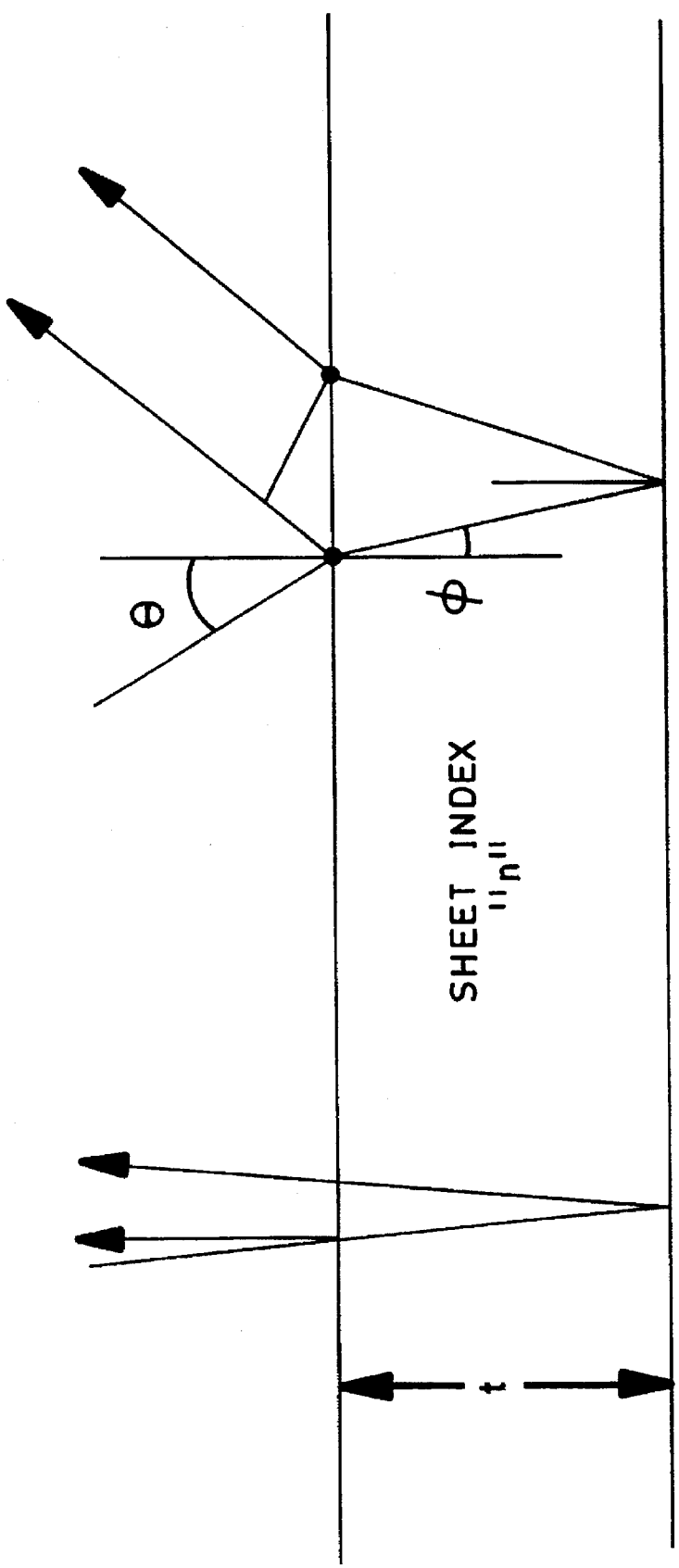
FIG. 7 is a diagrammatic elevational view of a "fictitious equivalent" single layered medium useful as a model in understanding the invention.

The phases plotted in FIG. 6 were obtained from the spectral reflectance data. In view of possible ambiguity for such large phase shifts, a simplified physical model was used as a guide. The medium structure can be analytically replaced by a single sheet with reflection from upper and lower surfaces, thereby removing the complication caused by the multiple thin layers on the lower surface, if a fictitious "equivalent" refractive index is used (FIG. 7).

The order of interference (number of wavelengths discrepancy) for the two reflected beams can be shown to vary as:

$$m = \frac{2nt}{\lambda} \sqrt{1 - \frac{\sin^2\theta}{n}}$$

The rate of change is then:

$$\frac{dm}{d\theta} = -\frac{nt}{\lambda} \left( \frac{\sin\theta \cos\theta}{\sqrt{n^2 - \sin^2\theta}} \right)$$

The phases taken from the calculated values are not ambiguous at small angles, and an effective index of n=1.4 can be inferred from which the fitted smooth graph in FIG. 6 was calculated.

Because the f/11 beam is more accurately a 1.9° pair than a 2° pair, the incidence angle for phase cancellation may be taken as (2.0/1.9)×16°≈17°. Thus, at 17° with a nominal sheet and actual exposure, the reflectance would be expected to be independent of wavelength and also independent of local thickness, within a reasonable range.

This two-beam model implies that "clouds" would show up again at larger angles, reaching maxima at 38° and 62°, but that will not happen. A more complete treatment should show that the visibility of the clouds with angle will drop off roughly as a Fourier transform of the pupil illumination pattern. Since the Gaussian is truncated at its edges where the intensity is down by $1/e^2=0.1353$, the transform will exhibit only minimal "ringing" about its axis and will not regain much amplitude.

Figure 8:
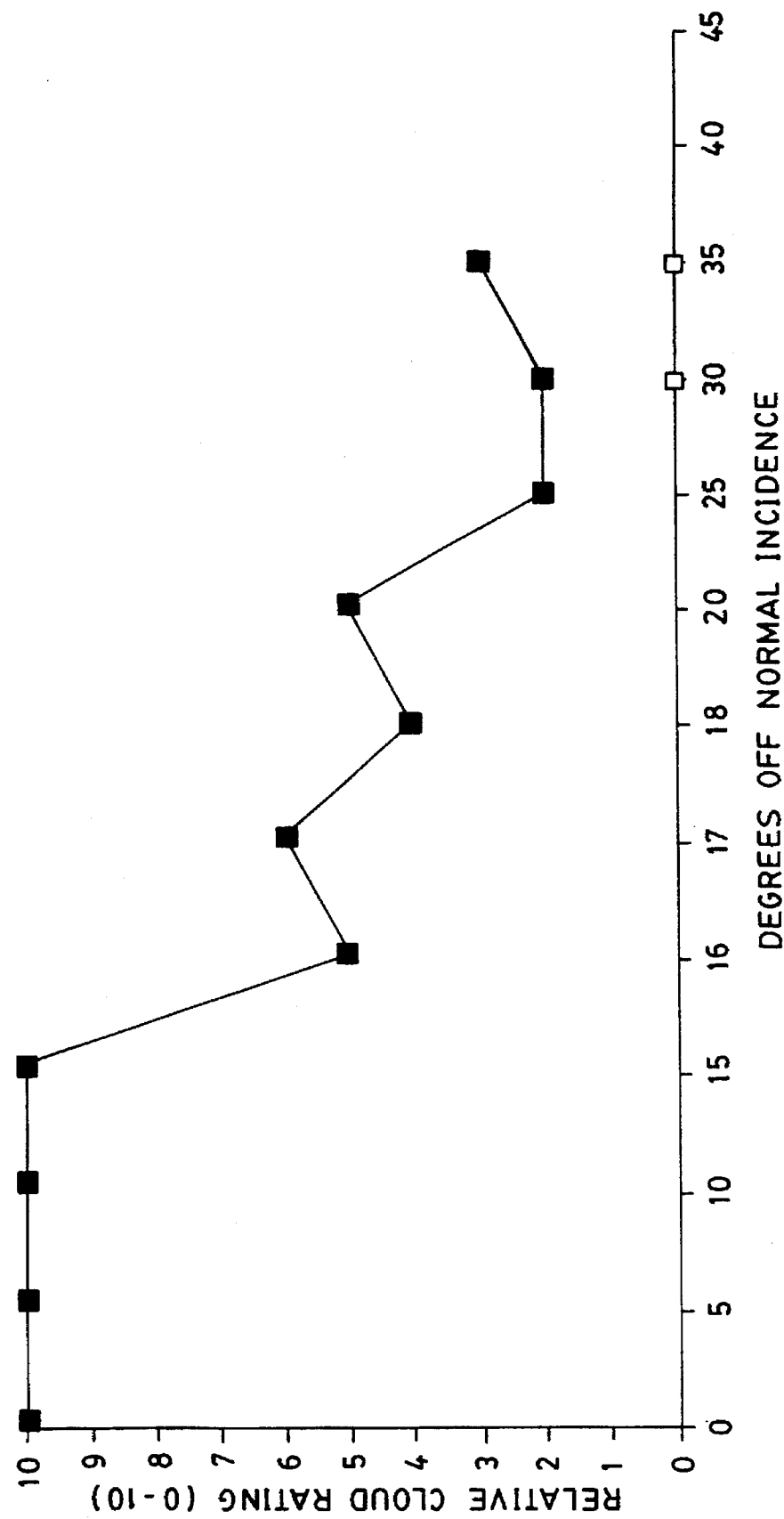
FIG. 8 is a plot of relative cloud severity actually measured as a function of the angle of incidence of a Gaussian laser beam used to expose a multilayered medium.

Measurement made of "clouds" vs. angle of incidence (i.e., relative cloud severity) confirm the effectiveness of this technique (FIG. 8) and even are in good angular agreement with this simplified calculation. As can be seen there, benefit from off-normal exposure begins at approximately 16 degrees and continuously improves up to 25 degrees where it levels off.

Figure 9:
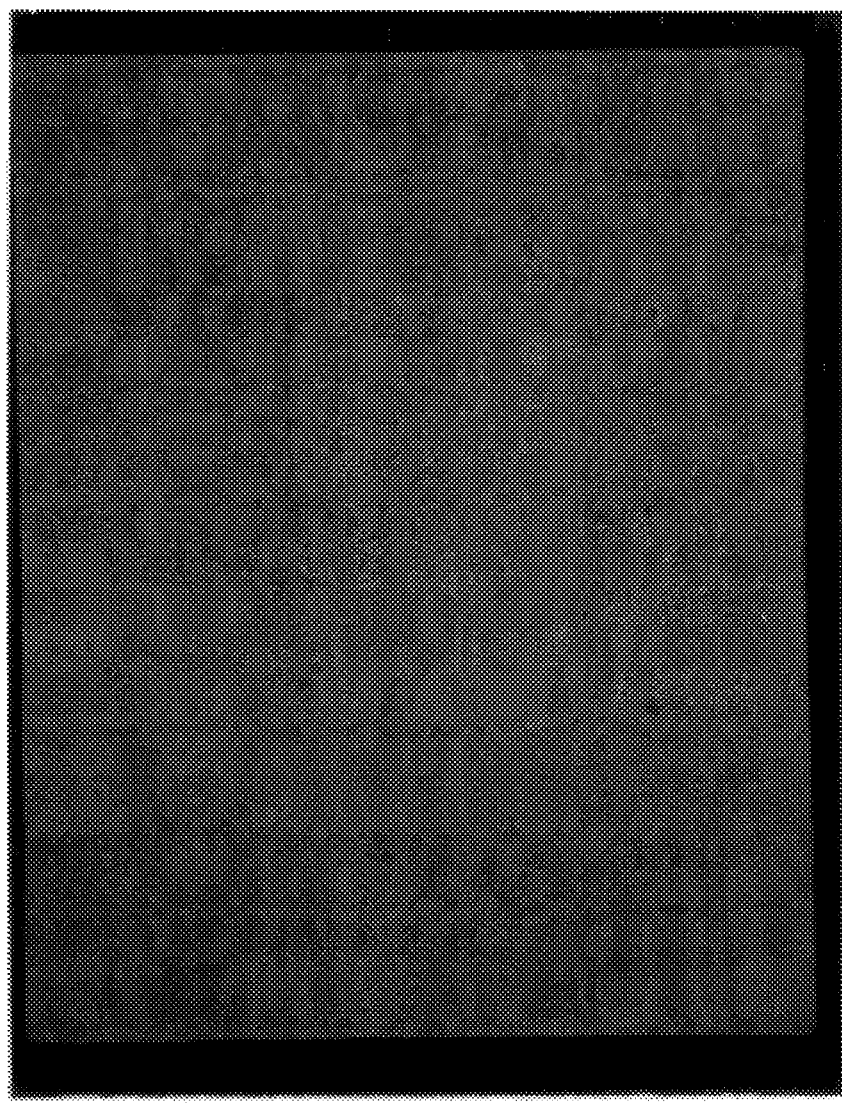
FIG. 9 is a photograph of the improvement on the "cloud" or "woodgrain" artifact problem that can result from exposing a multilayered imaging medium using the methods and apparatus of the invention.

FIG. 9 photographically shows the reduction in the cloud artifact by exposure at 25 degrees from normal incidence. As can be appreciated the improvement is significant when compared with exposure at normal incidence as shown in FIG. 3.

Figure 10:
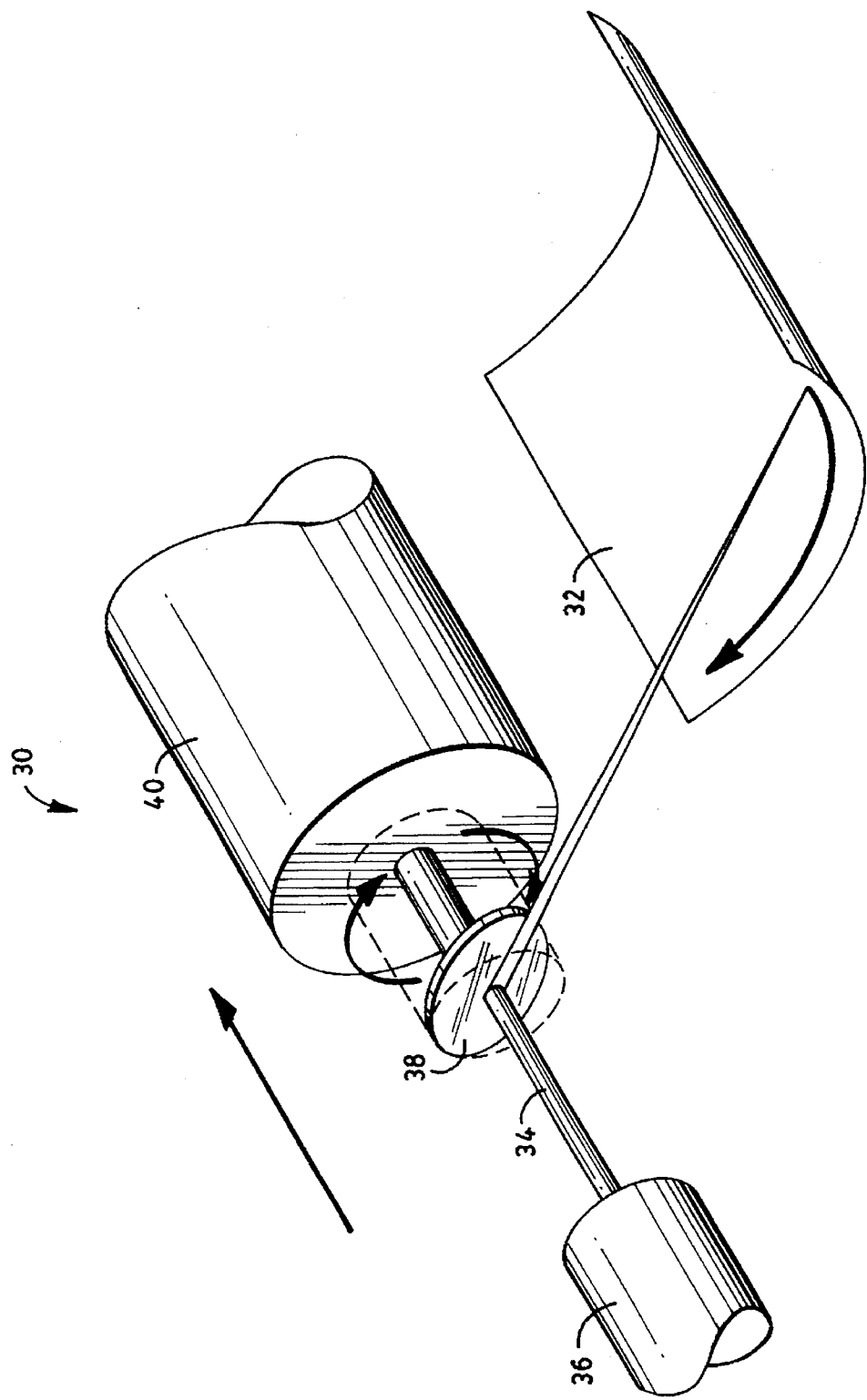
FIG. 10 is a diagrammatic perspective view of an inventive exposure apparatus.

FIGS. 10 and 11 show apparatus by which multilayered media may be exposed at other than normal incidence to eliminate or ameliorate clouding or woodgraining artifacts. As seen, a scanning system 30 exposes multilayered medium 32, again mounted on a stationary curved surface 33, which serves as a means for mounting the medium for purposes of exposing it. Exposure is made via a modulated Gaussian laser beam 34 that emerges from an optical head 36. Beam 34 is folded via a rotating scanning mirror 38 that is mounted for linear translation (direction of the arrow) via a carriage 40. Mirror 38 may be converging. Exposure is at an angle, θ, that is preferably 25 degrees from normal incidence. Obviously, carriage 40 and media 32 are offset in the direction of translation to effect the off normal exposure.

In one preferred embodiment, 25 degrees off normal was found appropriate for a laser beam diameter of 15 micrometers, a converging lens with a focal length of 200 mm, and an f-number of 14. Written spot size will obviously influence what the optimal off normal exposure ought to be in particular cases since the f-number dictates the angles at which light rays strike the medium; the larger the f-number the smaller the range of angles.

Another way of implementing the off normal exposure is through the use of a prism or mirror after the scanning mirror in the system. There are also various other ways of using spinning prisms with the optical head or conical non-spinning forms down the length of the drum to accomplish the same action. And, it should be apparent that the beam may be made to converge to the desired spot diameter by placing the appropriate curvature in the scanning mirror itself.

While the invention has been described with reference to preferred apparatus and methods, it will be apparent to those skilled in the art that various changes and modifications may be made therein without departing from the scope of the invention as set forth in the claims.

What is claimed is:

1. A method for minimizing exposure artifacts when exposing a multilayered imaging medium, comprising the steps of:

scanning said medium with a laser beam while modulating said beam with image information to form an image in said medium; and averaging out an exposure error between two predetermined angles of incidence of said beam to said medium.

2. The method of claim 1 wherein said averaging step comprising averaging out an exposure error between said two predetermined angles of incidence having a difference of 1.9 to 2.0 degrees existing between said two angles of incidence.

3. The method of claim 1 wherein said scanning step comprises scanning said medium with a laser beam having an f-number of f/11.

4. Apparatus for exposing a multilayered imaging medium to minimize exposure artifacts, said apparatus comprising:

means for scanning said medium with a laser beam while modulating said beam with image information to form an image in said medium; and means for averaging out an exposure error between two predetermined angles of incidence of said beam to said medium.

5. The apparatus of claim 4 wherein a difference of 1.9 to 2.0 degrees exists between said two angles of incidence.

6. The apparatus of claim 4 wherein an f-number of the beam is f/11.

* * * * *